(12) United States Patent
Heberger et al.

(10) Patent No.: US 6,645,615 B2
(45) Date of Patent: *Nov. 11, 2003

(54) SILICONE COATED FILM WITH BACK SIDE SLIP CONTROL COATING AND METHOD OF CONTROLLING SLIP OF SUCH FILM

(75) Inventors: John M. Heberger, Greer, SC (US); Kenneth J. Muschelewicz, Easley, SC (US)

(73) Assignee: Mitsubishi Polyester Film, LLC, Greer, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/042,664

(22) Filed: Jan. 9, 2002

(65) Prior Publication Data

US 2002/0122935 A1 Sep. 5, 2002

Related U.S. Application Data

(62) Division of application No. 09/527,044, filed on Mar. 16, 2000, now Pat. No. 6,376,067.

(51) Int. Cl.$^7$ .......................... B32B 27/08; B32B 27/20; B32B 27/18; B32B 27/36
(52) U.S. Cl. .................. 428/336; 428/40.1; 428/41.4; 428/41.8; 428/331; 428/336; 428/446; 428/447; 428/480; 528/293; 528/294; 528/295; 528/302; 528/308
(58) Field of Search ................. 428/480, 219, 428/220, 331, 340, 446, 447, 376, 483, 910, 41.4, 40.1, 41.8; 528/293, 294, 295, 308, 302

(56) References Cited

U.S. PATENT DOCUMENTS

| | | | | | |
|---|---|---|---|---|---|
| 4,961,992 | A | * | 10/1990 | Balloni et al. | 428/332 |
| 4,983,447 | A | * | 1/1991 | Crass et al. | 428/216 |
| 5,077,353 | A | * | 12/1991 | Culbertson | 525/446 |
| 5,212,012 | A | * | 5/1993 | Culbertson | 428/336 |
| 5,212,260 | A | * | 5/1993 | Culbertson | 525/446 |
| 5,298,325 | A | * | 3/1994 | Culbertson | 428/336 |
| 5,424,120 | A | * | 6/1995 | Culbertson | 428/336 |
| 6,120,868 | A | * | 9/2000 | Heberger et al. | 428/41.4 |
| 6,376,067 | B1 | * | 4/2002 | Heberger et al. | 428/336 |

FOREIGN PATENT DOCUMENTS

JP 05-194768 A * 8/1993

* cited by examiner

Primary Examiner—Vivian Chen

(57) ABSTRACT

The present invention relates to a self-supporting polymer film with a silicone-containing coating layer on the front surface that is capable of releasing free silicone oil and a slip control coating on the back surface, where the slip control coating has an exposed surface adapted to contact the free silicone oil. The slip control coating includes water soluble copolyester; and optionally includes a coupler, preferably a silane. A method for controlling the slip of silicone coated film by coating the back side of the film with this slip control coating is also disclosed.

36 Claims, No Drawings

SILICONE COATED FILM WITH BACK SIDE SLIP CONTROL COATING AND METHOD OF CONTROLLING SLIP OF SUCH FILM

This is an divisional application of U.S. Ser. No. 09/527,044, filed Mar. 16, 2000, U.S. Pat. No. 6,376,067.

BACKGROUND OF THE INVENTION

1. Field Of The Invention

The present invention relates generally to a silicone-coated polymeric film having a back side coating effective to reduce the undesirable slip generated by the by-product or contaminant silicone oil released from the silicone coating. It further relates to a method for controlling undesirable slip in silicone-coated polymeric film by coating the back side of the film with a slip control coating.

2. Description Of Related Art

Silicone-coated polymer films are well known and commercially available. Such silicone-coated polymer films are commonly employed as release films for labels, pressure sensitive tapes, decorative laminates, transfer tapes and the like. The silicone coating on the base polymer film allows the adhesive face of the label, for example, to be easily removed from the support film by the end user, while providing sufficient stability to the label to prevent it from being accidentally dislodged from the support film before use. Among other things, silicone release coatings can also be used as container liners designed for contact with food. Pizza box liners coated with silicone release coatings, for example, allow melted cheese to release easily. Food waste is minimized, the food is served more easily, and the appearance of the product is maintained.

A variety of different silicone release coatings are known in the art. These silicone release coatings include crosslinked formulations, ultraviolet curable or heat curable formulations, solvent-based and solvent-free formulations, and combinations of the foregoing, such as solvent-free, ultraviolet curable formulations. As disclosed in U.S. Pat. No. 5,350,601 to Culbertson et al., incorporated herein by reference in its entirety, primer formulations have been discovered that allow these silicone release coatings to bond effectively with the base polymer films, and to remain bonded over time to the base polymer film. These primer formulations are typically applied to the base polymer film, and the silicone release coating is applied on top of the resulting primer layer. The resulting coated polymer film provides superior performance. For example, coating rub-off, which can cause labels to release too easily, is minimized. Moreover, coating delamination, which can cause labels to adhere directly to the underlying base polymer film, is also minimized or eliminated.

However, during manufacture and during storage of the coated film prior to use, free silicone oil is inevitably released from the coating layer onto the surface of the coated film. This migration creates a high slip layer or discrete patches of free silicone oil on the film surface. Free silicone oil can also be transferred easily to the non-silicone-coated back side of the film. When, for example, the coated film is stored in front-to-back-face contact, as in a typical roll of film, some of the free silicone oil (typically low molecular weight silicones) on the front, silicone coated surface of the film will be transferred to the back (typically uncoated) surface of the roll. In the film roll, which is typically formed during manufacture for storage or transport, the front, silicone coated surface is placed in contact with the back surface of the same web as it is wound.

In practice, this free silicone oil contamination can be a drawback. For example, when the coated film traverses over idler rolls during subsequent processing steps (e.g., during label application), the idler rolls can slip and lose contact with the film. This can result in uneven tension on the film web or loss of alignment. Related problems arise when printing the resulting silicone-coated film or labels applied to that film. The ability of printing inks and solvents to adhere is impaired by the presence of free silicone oil on the surface to be printed. Moreover, loss of alignment due to the film's high slip can lead to a high reject rate during printing, particularly where multiple printing passes are used and proper alignment is crucial to forming an integrated final image.

The prior art has recognized the existence of the free silicone oil on the surfaces of the coated film, and the resulting transfer contamination problem. However, no suggestion has been made in the known art of any approach to controlling the free silicone oil generated by the coated film. Instead, in an implicit acknowledgment that no solution to the transfer contamination problem was available or evident, prior art patents (e.g., U.S. Pat. No. 5,110,671 to Balloni et al. and U.S. Pat. No. 4,961,992 to Balloni et al.) have attempted to use the free silicone oil and the resulting increased slip to improve processing.

Nonetheless, it remains commercially desirable to control the effects of free silicone oil. Film processing parameters are highly sensitive to changes in film friction properties. Ideally, silicone-coated films would have a coefficient of friction ("COF") equivalent to that of plain film to simplify processing. This would eliminate the costly and time consuming equipment and setting modifications that are required to process film having substantially different COFs, as well as the higher reject rate inherent in processing under significantly different COF conditions.

U.S. Pat. No. 5,350,601 to Culbertson et al., discussed above, discloses a silicone-ready primer coating including a glycidoxy silane and a copolyester. This primer coating is designed for use under a silicone coating, to improve the integrity of the silicone coating on a base polymer film. While the Culbertson et al. patent makes reference to coating both sides of the film with the primer coating, it is envisioned only that a silicone coating will be applied to all primer coated surfaces. There is no suggestion that one side would be coated while the other would be left uncoated. More importantly, there is no suggestion in the Culbertson et al. patent of the silicone-binding properties of the silane and copolyester coating.

A commercial product sold at least as early as one year prior to the filing date of the present application by the assignee of the present invention under the designation Hostaphan® 3SAC polyester film included a silicone-ready primer coating on both sides. That silicone-ready primer coating included an isophthalic acid/sodium 5-sulfoisophthalic acid/malonic acid/ethylene glycol copolyester, a glycidoxypropyltrimethyoxysilane, a colloidal $SiO_2$ and sodium lauryl sulfate. However, neither side of the film, as sold by the assignee, was silicone coated. The film was sold as a silicone-ready film, and purchasers of the film are known to have coated it with silicone. However, the inventors are not aware of any purchaser who coated one side with silicone, but not the other. Alternate films with the silicone-ready coating on a single side only (e.g., 3SAB polyester film) were available to customers not interested in silicone coating both sides.

BRIEF SUMMARY OF THE INVENTION

Accordingly, it is an object of the present invention to provide a base polymer film with a coating capable of attracting and tying up free silicone oil contaminants.

It is a further object of the present invention to provide a base polymer film with a slip control coating on the opposite side of the base polymer film from the silicone coating. This slip control coating can minimize slippage caused by free silicone oil released from the silicone coating.

It is another object of the present invention to provide a back side coating that provides a resulting film having a COF equivalent to that of plain, uncoated polymer film.

It is yet another object of the present invention to provide a method of controlling slippage on silicone-coated film by means of a reverse-side coating.

The present invention has accomplished these objectives by providing a self-supporting polymer film with a silicone-containing coating layer on the front surface that is capable of releasing free silicone oil and a slip control coating on the back surface, where the slip control coating has an exposed surface adapted to contact the free silicone oil. The slip control coating includes a binder, preferably including a water-soluble copolyester including about 50 to about 98 mol percent isophthalic acid, about 2 to about 20 mol percent of at least one sulfomonomer containing a sulfonate group attached to a dicarboxylic nucleus, and about 100 mol percent of at least one copolymerizable glycol having from about 2 to about 11 carbon atoms; and also includes a coupler, preferably including a silane. An alternate preferred binder is polyvinyl pyrrolidone (PVP). A method for controlling the slip of silicone coated film by coating the back side of the film with this slip control coating is also disclosed.

DETAILED DESCRIPTION OF THE INVENTION

Slip Control Coating

The slip control coating of the present invention acts as an absorbent that is able to tie up substantial amounts of free silicone oil. Thus, when free silicone oil is released from a silicone coating applied to the base polymer film, the slip control coating is able to absorb or otherwise take up, tie up, deactivate or render less lubricant some or all of that free silicone oil. Consequently, the COF of the resulting film is increased, allowing the film to be processed more easily and evenly.

Most preferably, the slip control coating is applied to a surface (for reference purposes, referred to herein as the back surface) of the base polymer film opposite the surface (the front surface) bearing the silicone coating. When the film is wound up into a roll for further processing, transport or storage, the front and back surfaces come into close and direct contact. The slip control coating can then accept the loose silicone released from the silicone coating, and prevent or minimize the formation of patches of free silicone oil on either the front or the back surface of the film. While it is preferred that the slip control coating be applied evenly over the entire back surface of the film, it is also envisioned that the absorbent slip control coating may be applied in selected areas or patterns, or at varying thicknesses, or a combination thereof.

The slip control coating of the present invention preferably includes a binder to anchor the slip control coating to the base polymer film. One preferred binder is a water soluble copolyester. Preferably, the water soluble copolyester includes a copolyester as disclosed in U.S. Pat. No. 4,493,872 to Funderburk et al., the disclosure of which is incorporated herein by reference in its entirety. This copolyester is disclosed as the condensation product of the following monomers or their polyester forming equivalents: isophthalic acid, a sulfomonomer containing an alkali metal sulfonate group attached to a dicarboxylic aromatic nucleus and an alkylene glycol with about 2 to about 11 carbon atoms. Optionally, an aliphatic dicarboxylic acid of the formula $HOOC(CH_2)_n COOH$, where n is about 1 to about 11, can also be employed as a monomer therein. An optimal copolyester is made up of about 90 mol percent isophthalic acid, about 10 mol percent of the sodium salt of 5-sulfoisophthalic acid and about 100 mol percent ethylene glycol. Alternatively, the ethylene glycol can be replaced with a propane diol, such as 1,3-propane diol, or combinations of the two can be used.

It is important to note, however, that the preferred percentage of sulfomonomer, isophthalic acid and aliphatic dicarboxylic acid employed is somewhat broader in the context of the present invention than in the Funderburk et al. patent. For example, in the context of the present invention, isophthalic acid is preferably about 40 to about 98 mol percent, aliphatic dicarboxylic acid is preferably about 0 to about 50 mol percent, and the sulfomonomer is preferably about 2 to about 20 mol percent. In addition, the sulfomonomer group of the present invention is not limited to an alkali metal sulfonate group. Any sulfomonomer in which a sulfonate group is attached to a dicarboxylic nucleus is preferred for use herein. In fact, any water soluble copolyester that functions to bind the coating to the surface of the base polymer film, either alone or synergistically in combination with other components, is preferred for use in the slip control coating of the present invention.

An alternate preferred binder component for use in the present invention is polyvinyl pyrrolidone (PVP). Preferably, a polyvinylpyrrolidone, PVP K-15®, from ISP, is used. It has also been found that PVP (and less preferably, the copolyester binder) are preferably used in conjunction with a plasticizer, in part to enhance the coating coalescence. This plasticizer preferably includes glycerol, ethylene glycol, or a combination of the two. The binder may also include a water soluble copolyester and PVP.

The binder is preferably present at about 0.1 to about 25 weight percent of the slip control coating composition. It is more preferably present at about 1 to about 10 weight percent, and most preferably at about 2.6 weight percent. However, a PVP binder is most preferably present at about 10 weight percent. When a plasticizer is used in combination with the PVP, it is preferably present at about 0.01 to about 5 weight percent, more preferably about 0.1 to about 2 weight percent.

It is also preferred that the slip control coating of the present invention include a coupler component to couple with or otherwise absorb or tie up the free silicone oil contaminant. Preferably, the coupler includes a silane component. More preferably, the slip control coating includes a glycidoxy silane, most preferably a glycidoxypropyltrimethoxysilane, such as the one commercially available as Dow Corning Z-6040® glycidoxypropyltrimethoxysilane.

The coupler component is preferably present at about 0.1 to about 10 weight percent of the slip control coating composition, more preferably at about 0.5 to about 5 weight percent. Most preferably, the coupler component is present at about 1.4 weight percent.

The preferred proportion of the coupler to the binder, when the two are combined in the slip control coating of the present invention, is in the range of about 1:3 to about 3:1 by weight. Although the scope of the present invention is intended to cover even broader ranges, it has been found that these proportions provide better results. More preferably, the slip control coating will include about 1 part coupler to about 2 parts binder by weight.

In addition, a wicking aid is preferably incorporated into the slip control coating of the present invention. The wicking aid is believed to enhance the ability of the slip control coating to absorb or otherwise take up free silicone oil. The wicking aid is preferably inorganic. More preferably, the wicking aid includes colloidal $SiO_2$, most preferably the product commercially available as Nalco 1060® colloidal $SiO_2$. Other wicking aids that are preferred for use in the present invention include silica in one or more of its various morphological forms, including those commercially available as Syloid® silica or Rapidup® silica. Moreover, a combination of two or more of the foregoing wicking aids is also preferred for use. The wicking aid is preferably present at about 0.01 to about 3 weight percent of the slip control coating, more preferably at about 0.1 to about 1 weight percent. Most preferably, the wicking aid is present at about 0.4 weight percent.

Moreover, the slip control coating of the present invention preferably includes a surface active agent. It is believed that this surface active agent enhances the appearance of the slip control coating when it is coated onto the base polymer film. More preferably, the surfactant includes an anionic surfactant, most preferably sodium lauryl sulfate. Alternate preferred surfactants that have been shown effective in the compositions of the present invention include fluorosurfactants, including the surfactant commercially available from 3M as Fluorad® FC-170C; sodium dodecylbenzene sulfonate, including the product commercially available as Rhodacal® LDS-10 surfactant from Rhone Poulenc; ethoxylated 2,4,7,9-tetramethyl-5-decyl-4,7-diol, including the product commercially available from Air Products as Surfynol® 465. In addition to other beneficial properties, these surfactants have been shown to provide enhanced resistance to blocking. It is preferred that the surfactant be present in the slip control coating at about 0.0001 to about 5 weight percent, more preferably at about 0.001 to about 1 weight percent. Most preferably, the surfactant is present at about 0.04 weight percent.

It has also been found that the pH of the slip control coating affects its performance. Preferably, the pH of a copolyester-based and/or silane-based slip control coating, as applied, is about 7 to about 10, more preferably basic, from about 7.5 to about 9. Consequently, the selection of alkaline components, such as alkaline wicking aid Nalco 1060® colloidal $SiO_2$, will affect the pH of the resulting slip control coating, and thus its performance. Conventional pH modifiers may preferably be used to the extent necessary to achieve the desired pH levels, alone or in combination with alkaline wicking aids. Other conventional additives may also be used in the slip control coating of the present invention.

The slip control coating of the present invention is typically applied to the base film as an aqueous dispersion and at a solids concentration in the range of about 0.5 to about 12 weight percent, more preferably at about 2 to about 6 weight percent. The preferred solids level of the slip control coating, as it is applied to the base polymer film, is a level sufficient to yield a final dry coating thickness within the range of about 0.03 $g/m^2$ to about 0.15 $g/m^2$. The preferred thickness of the dried slip control coating is about $2.5 \times 10^{-9}$ m to about $2.5 \times 10^{-6}$ m with a more preferred thickness of about $2.5 \times 10^{-8}$ m.

While the COF of the back surface of the film, measured against itself (back-to-back) is highly dependent on variable manufacturing and processing analyses, it can generally be said that a back-to-back COF of greater than about 0.30 is preferred for coated films of the present invention, with back-to-back COF of greater than about 0.35 being more preferred, and greater than about 0.40 being most preferred. Expressed in a relative fashion, it is preferred that the coated films of the present invention have a back-to-back COF at least about 0.10 greater than the same silicone-coated film without a slip control coating of the present invention.

Base Film

The slip control coatings and coatings method of the present invention are applicable to any polymeric film capable of acting as a substrate for a silicone-release coating and a slip control coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated above by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide or mixtures thereof, antistatic agents and the like, all of which are well known in the art.

In addition, the base polymer film may be a polymer laminate. Such laminates include polymer-polymer laminates like polyester-polyolefin or polyester-adhesive-polyolefin, polymer-metallic laminates such as polyester-aluminum, or polymer-paper or polymer-adhesive-paper laminates.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with monoaxial orientation being less preferred. Generally, stretching occurs in a temperature range from about the second order transition temperature of the polymer to below the temperature at which the polymer softens and melts. Where necessary, the film is heat treated after stretching to "lockin" the properties by further crystallizing the film. The crystallization imparts stability and good tensile properties to the film. Such heat treatment for polyester film is generally conducted at about 190° C. to about 240° C.

Silicone Coating

The silicone coatings preferred for use in the present invention are silicone release coating compositions. A variety of silicone release coating compositions are commercially available, with preferred compositions including those sold by Wacker Silicones Company, General Electric Silicones, PLC (Rhodia), Dow-Corning and others. The silicone coating can be, but is not limited to, a solvent cross-linkable type silicone coating, a solvent-free silicone coating, a solvent-free ultraviolet or electron beam curable silicone coating, or an aqueous based silicone coating. The slip control coating of the present invention is useful in conjunction with any silicone coating that releases free silicone oil. Thus, any films coated with silicone coatings that generate free silicone oil contaminants can also benefit from use with the back side coatings and coating methods of the present invention.

A preferred silicone coating for use in the present invention is a thermal cured silicone coating, more preferably a platinum catalyzed coating. Most preferably, the silicone coating used is the silicone coating present on the polyester film commercially available from Mitsubishi Polyester Film, LLC as Hostaphan® 2SLK. It is preferred that these be contained in a silicone emulsion. It is, of course, important that the slip control coating not interfere substantially with the curing and anchoring ability of the silicone coating on the front side. Accordingly, the compatibility of the slip control coating with the specific silicone coating must be considered. It is preferred that the silicone coating be fully cured.

Coating Methods

In-line coating of the base polymer layer, in which the coatings are applied during the film manufacturing process and before it is heat-set, is the preferred method for use herein. Typically, the base polymer film is coated after corona treatment and prior to the stretch orientation of the film as described in British Patent No. 1,411,564, or coated between drawing steps (when biaxially oriented film is produced) as taught by U.S. Pat. No. 4,571,363, or coated post-draw as taught by U.S. Pat. No. 3,322,553.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watts per square foot per minute is typically sufficient to achieve the desired results.

In light of the foregoing, a preferred method of controlling slip of a silicone-coated film is provided herein. Preferably, a back face of a base polymer film is coated with a slip control coating of the present invention. This coating can occur before, after or at the same time the front face of the base polymer film is coated with the silicone coating. The slip control coating is applied at a stage before the silicone coating is applied, or it can be applied after the silicone coating is applied. The slip control coating is preferably not overcoated with another coating. Such a top coating could limit the ability of the slip control coating to tie up or otherwise limit the slip of the free silicone oil contaminants. Moreover, it is possible to coat layers of individual components or submixtures of the slip control coating in sequence on a base polymer layer to achieve the objectives of the coating. Such layering would be encompassed within the scope of the present invention.

EXAMPLES

The following Examples demonstrate various aspects of certain preferred embodiments of the present invention, and are not to be construed as limitations thereof.

Example 1

The following Base Coating Sample was formulated:

Slip Control Coating A

Slip control coating made up of 2.6% of a copolyester of 90 mol percent isophthalic acid, 10 mol percent of the sodium salt of 5-sulfoisophthalic acid and 100 mol percent ethylene glycol+1.4% glycidoxypropyltrimethoxysilane (Dow Corning Z-6040®)+0.4% colloidal silica (Nalco®1060 colloidal $SiO_2$)+0.04% sodium lauryl sulfate+ water Certain variations of these samples were also formulated, as set forth in the chart below.

Silicone Coating S is a commercially available silicone coating sold coated on a base film as Hostaphan® 2SLK polyester film.

Biaxially oriented, heat set PET film was in-line coated between draw steps with the following samples, and tested for COF, measuring both back-to-back and front-to-front COF. COF was determined via ASTM method D-1894-63. The Back Side Coating pH was also determined. Selected samples were also tested after 72 hours at 1000 psi (back-to-back COF only):

| Sample | Front Side Coating | Back Side Coating | pH | Initial Back to Back COF | Initial Front to Front COF | Back Side COF after 72 hours |
|---|---|---|---|---|---|---|
| C1 | None | None | | 0.45 | 0.46 | |
| C2 | S | None | | 0.29 | 0.13 | 0.25 |
| C3 | None | A | 7.62 | 0.49 | 0.46 | |
| 1 | S | A | 7.62 | 0.41 | 0.14 | 0.40 |
| 2 | S | A with pH modifier | 9.00 | 0.42 | 0.14 | 0.41 |

-continued

| Sample | Front Side Coating | Back Side Coating | pH | Initial Back to Back COF | Initial Front to Front COF | Back Side COF after 72 hours |
|---|---|---|---|---|---|---|
| 3 | S | A with no colloidal silica | 6.30 | 0.29 | 0.14 | 0.28 |
| 4 | S | A at 8% solids | 8.55 | 0.40 | 0.14 | 0.39 |
| 5 | S | A at 8% solids with no colloidal silica | 6.00 | 0.33 | 0.13 | 0.31 |
| 6 | S | Copolyester of A only | 8.08 | 0.27 | 0.13 | 0.25 |
| 7 | None | Copolyester of A only | 8.08 | 0.45 | 0.45 | |
| 8 | S | 50/50 (copol. to silane) A | 8.72 | 0.41 | 0.13 | 0.42 |
| 9 | S | 50/50 A with no colloidal silica | 6.40 | 0.33 | 0.13 | 0.30 |
| 10 | S | A with double the colloidal silica | 8.72 | 0.43 | 0.13 | 0.40 |
| 11 | S | A with pH modifier but no colloidal silica | 9.20 | 0.43 | 0.13 | |

Sample C1 is an uncoated control sample, showing equivalent, high front-to-front and back-to-back coefficients of friction of 0.46 and 0.45, respectively, under the prevailing test conditions. Sample C2 is the silicone-coated control, having the conventional front side silicone coating (designated "S") and no back side coating It shows a very low front-to-front COF of 0.13, attributable to the silicone coating. It clearly demonstrates the effect of silicone transfer to the back side, with a back-to-back COF of 0.29 (a reduction of 0.16 from the uncoated control) initially, and an even lower COF of 0.25 after 72 hours. These data demonstrate that the silicone transfer problem can increase over time. Sample C3 is also a control, having no front side silicone coating, but including the base slip control Coating A on the back side. The resulting COF data are in line with those of the plain film of Sample C1.

The remaining samples demonstrate the effects of Coating A, or modifications of, on the COF of silicone coated film. Sample 1, with a back side Coating A, has initial front-to-front COF of 0.14, similar to that of control Sample C2. However, its initial back-to-back COF is 0.41, very close to that of uncoated control Sample C1, and substantially higher (0.12 higher) than that of control Sample C2. This demonstrates the dramatic improvement in slip control preferred Coating A provides to silicone coated film.

Sample 2 is similar to Sample 1, however the pH of Coating A has been increased to 9.00 from 7.62. The COF results are similar.

However, Sample 3, in which the formulation of Coating A is prepared without addition of colloidal silica, consequently reducing the pH to 6.3 from 7.62, shows an almost complete elimination of the COF effect of Samples 1 and 2. Sample 3 has COF properties almost identical to that of silicone coated control Sample C2, although with slightly less decrease in back-to-back COF over time. It appears, based on Sample 11, that this effect is primarily attributable to the decreased pH, and not the lack of colloidal silica. Sample 11 incorporates a higher pH Coating A formulated without colloidal silica, but with a pH modifier, such as ammonium hydroxide. Its properties are similar to high pH Sample 2. Similarly, doubling the amount of colloidal silica (see Sample 10) also has little effect on the film's COF.

Increasing the solids of Coating A to 8 percent (roughly double that of base Coating A) has little effect on its performance, as shown in Sample 4. However, removing the colloidal silica, and consequently decreasing the coating pH, as shown in Sample 5, produced a dramatic, although not complete, decline in performance.

Sample 6 and control Sample 7 demonstrate that the copolyester component of Coating A, by itself, does not provide any improved benefits. The COF data of Sample 6 are similar to that of silicone coated control Sample C2. Sample 7 acts as a further control, showing that plain film with the copolyester element of Coating A, alone, has similar properties to untreated film Sample C1.

Further manipulation of Coating A demonstrates that a composition of equal proportions of copolyester to silane in Coating A (see Sample 8) produces results equivalent to that of base Sample 1. It should be noted that back-to-back COF actually improved slightly after 72 hours for this sample. When the colloidal silica of this sample is removed, and the pH is consequently lowered (see Sample 9), we see the expected dramatic decline in COF performance.

Thus, Coating A is believed to function most effectively at a basic pH, across a broad range of solids weight percent. Its copolyester component alone provides no appreciable improved function; thus, the copolyester combines synergistically with the glycidoxysilane to provide the improved function. However, as shown in Example 11, excellent results are achieved without the colloidal silica, provided the pH was raised sufficiently to compensate for its absence.

Example 2

As a separate trial, biaxially oriented, heat set PET film was in-line coated between draw steps with the following samples, and tested for COF initially, back-to-back and front-to-front. Selected samples were tested after 72 hours at 1000 psi. Certain of these samples were returned to ambient pressure and retested after two weeks of storage (back-to-back only):

| Sample | Front Side Coating | Back Side Coating | Initial Back to Back COF | Initial Front to Front COF | Back Side COF after 72 hours | Back Side COF after 2 weeks |
|---|---|---|---|---|---|---|
| C1 | None | None | 0.38 | | 0.39 | |
| C2 | S | None | 0.26 | 0.13 | 0.26 | 0.24 |
| C3 | None | A | 0.33 | 0.33 | | |
| C4 | None | Copolyester of A only | 0.34 | 0.39 | | |
| 1 | S | A | 0.37 | 0.13 | 0.40 | 0.36 |
| 2 | S | Copolyester and colloidal silica of A only | 0.32 | 0.14 | 0.33 | 0.33 |
| 3 | S | Copolyester, colloidal silica and E | 0.31 | 0.14 | 0.32 | |
| 4 | S | A and 0.75% silica (Syloid 244 × 1517) | 0.45 | 0.15 | 0.43 | 0.44 |
| 5 | S | A + 0.75% silica (RapidUp) | 0.40 | 0.14 | 0.39 | |
| 6 | S with ½ the V20 | A + 0.75% silica (RapidUp) | 0.37 | 0.13 | 0.40 | |
| 7 | S | F | 0.30 | 0.13 | 0.28 | |
| 8 | S | G | 0.27 | 0.14 | 0.27 | |
| 9 | S | H | 0.23 | 0.13 | 0.25 | |
| 10 | S | I | 0.28 | 0.14 | 0.27 | |
| 11 | S | J | 0.29 | 0.15 | 0.19 | 0.23 |
| 12 | S with ½ the V20 | None | 0.27 | 0.13 | 0.25 | |

E is a fluorosurfactant commercially available from 3M as Fluorad ® FC-170C surfactant
F is the primer used on commercially available Hostaphan ® 2CSR polyester film
G is the primer used on commercially available Hostaphan ® 4400 polyester film
H is the primer used on commercially available Hostaphan ® 4700 polyester film
I is the primer used on commercially available Hostaphan ® 4LM2 polyester film
J is the primer used on commercially available Hostaphan ® 2DEF polyester film Once again, Sample C1 is an uncoated control sample, showing equivalent, high front-to-front and back-to-back coefficients of friction of 0.38 and 0.39 (after 72 hours), respectively, under the selected test conditions. The difference between the COF data for this C1 and Sample C1 of Example 1 can be attributed to typical variability in processing, with relative data being most significant. Sample C2 is the silicone-coated control, having the conventional front side silicone coating (designated "S") and no back side coating. It shows a very low front-to-front COF of 0.13, attributable to the silicone coating. It clearly demonstrates the effect of silicone transfer to the back side, with a back-to-back COF of 0.26 (a drop of 0.12 from the uncoated control) initially, and an even lower COF of 0.24 after 2 weeks. These data demonstrate that, left unchecked, the silicone transfer problem can grow worse over time. Samples C3 and C4 are also controls, having no front side silicone coating, but including the base slip control Coating A (or its copolyester component) on the back side. The resulting COF data are close to, but somewhat lower than, those of the plain film of Sample C1, which may be attributable to trial-to-trial processing variation.

Subsequent samples demonstrate the effects of Coating A, or modifications thereof, on the COF of silicone coated film. Sample 1, with a back side Coating A, has an initial front-to-front COF of 0.13, similar to that of control Sample C2. However, its initial back-to-back COF is 0.37, very close to that of uncoated control Sample C1, and substantially higher (0.11 higher) than that of control Sample C2. This again demonstrates the dramatic improvement slip control preferred Coating A provides to silicone coated film.

Samples 2 and 3 demonstrate that the copolyester and colloidal silica of Coating A, by themselves, provide much less of a benefit than the fall formulation of Coating A. This is expected, because no primary coupler is available in the coating. When a fluorosurfactant commercially available from 3M as Fluorad® FC-170C surfactant is added to the two components (Sample 3), no improvement is shown, with COF data actually declining slightly.

Significant increase of the back-to-back COF is found in Samples 4 and 5, where silica is added to the Coating A formulation. To the extent one is seeking to replicate the COF of uncoated film, these additives may not be necessary. However, when the highest possible COF is desired, both provide substantial increases over base Sample 1.

Sample 6 is a modification of Sample 5, in which the front side silicone coating is modified to include only half of the crosslinker. Back-to-back COF is lower than that of Sample 5, and identical to that of base Sample 1. Sample 12 acts as a control.

Samples 7 through 11 are comparative examples using the standard front-side silicone coating with other potential back side coatings. None represents a substantial improvement over silicone coated control Sample C2.

Example 3

The positive results attributable to a PVP binder are reflected in this example series. Back to back coefficient of friction (B/B COF) for this series is determined based on the back side against itself after a minimum of 16 hours of 1000 psi in contact with the silicone coated side.

Slip Control Coating B

Slip control coating made up of 0.65% of a copolyester of 90 mol percent isophthalic acid, 10 mol percent of the sodium salt of 5-sulfoisophthalic acid and 100 mol percent ethylene glycol+0.2% glycidoxypropyltrimethoxy-silane (Dow Corning Z-6040®)+1.2% colloidal silica (Nalco® 1060 colloidal $SiO_2$)+water Control Coating C Slip control coating made up of 2.6% of a copolyester of 90 mol percent isophthalic acid, 10 mol percent of the sodium salt of 5-sulfoisophthalic acid and 100 mol percent ethylene glycol+1.4% glycidoxypropyltrimethoxy-silane (Dow Coming Z-6040®)+1.2% colloidal silica (Nalco® 1060 colloidal SiO$_2$)+water

| Sample | Back Side Coating | Surface Energy | B/B COF |
|---|---|---|---|
| C1 | None | 38.58 | 0.24 |
| IC1 | B | 39.07 | 0.39 |
| IC2 | C | 45.08 | 0.39 |
| 1 | 1% PVP + 0.1% Z6040 + 0.1% glycerol + 1.2% 1060 | 44.99 | 0.39 |
| 2 | 10% PVP + 0.1% Z6040 + 1% glycerol + 1.2% 1060 | 61.33 | 0.38 |
| 3 | 1% PVP + 1.4% Z6040 + 0.1% glycerol + 1.2% 1060 | 44.82 | 0.54 |
| 4 | 10% PVP + 1.4% Z6040 + 1% glycerol + 1.2% 1060 | 52.99 | 0.3 |
| 5 | 1% PVP + 0.1% Z6040 + 0.1% ethylene glycol + 1.2% 1060 | 43.5 | 0.41 |
| 6 | 10% PVP + 0.1% Z6040 + 1% ethylene glycol + 1.2% 1060 | 55.48 | 0.37 |
| 7 | 1% PVP + 1.4% Z6040 + 0.1% ethylene glycol + 1.2% 1060 | 46.77 | 0.55 |
| 8 | 10% PVP + 1.4% Z6040 + 1% ethylene glycol + 1.2% 1060 | 61.05 | 0.29 |
| 9 | 10% PVP + 1.4% Z6040 + 1% ethylene glycol + 1.2% 1060 | 58.17 | 0.31 |
| 10 | 1% PVP + 0.1% Z6040 + 1.2% 1060 | 45.16 | 0.39 |
| 11 | 1% PVP + 1.4% Z6040 + 1.2% 1060 | 48.37 | 0.53 |

Example C is a comparative example demonstrating the low back to back COF of a silicone-coated film having no back side coating.

Examples IC1 and IC2 are alternate embodiments of the present invention, employing the two noted copolyester binders.

The remaining examples in this series employ a PVP binder. Excellent results are also achieved for these formulations. Most preferred are the samples containing 10% PVP K-15 (e.g., Examples 2, 4, 6, 8, 9) for the higher surface energy associated with them. This surface energy level is beneficial for any additional processing of the surface such as the application of a top coat or printing.

The present invention having been thus described with particular reference to the preferred forms and embodiments thereof, it will be obvious that various changes and modifications may be made therein without departing from the spirit and scope of the invention as defined in the appended claims.

What is claimed is:

1. A coated polymer film comprising:
   a self-supporting polymer film layer having a front surface and a back surface;
   a silicone-containing coating on said front surface that is capable of releasing free silicone oil;
   a slip control coating on said back surface, wherein said slip control coating has an exposed surface adapted to contact said free silicone oil,
   said slip control coating including:
      a binder including a water soluble copolyester including about 50 to about 98 mol percent isophthalic acid, about 2 to about 20 mol percent of at least one sulfomonomer containing a sulfonate group attached to a dicarboxylic nucleus, and about 100 mol percent of a propane diol.

2. The polymer film of claim 1, wherein said slip control coating further comprises a coupler including a silane.

3. The polymer film of claim 2, wherein said coupler comprises a glycidoxy silane.

4. The polymer film of claim 3, wherein said glycidoxy silane comprises glicidoxypropylitrimethodxysilane.

5. The polymer film of claim 3, wherein said coupler is present at about 0.1 to about 10 weight percent of said slip control coating.

6. The polymer film of claim 3, wherein said coupler is present at about 0.5 to about 5 weight percent of said slip control coating.

7. The polymer film of claim 3, wherein said binder and said coupler are present at a weight percent ratio of about 1:3 to about 3:1.

8. The polymer film of claim 2, wherein said binder and said coupler are present at a weight percent ratio of about 2:1.

9. The polymer film of claim 1, further comprising a primer layer between said polymer film layer and said silicone-containing coating.

10. The polymer film of claim 1, wherein said polymer film layer is oriented in at least one axial direction.

11. The polymer film of claim 1, wherein said polymer film has a backside to backside coefficient of friction that is substantially equivalent to that of uncoated polymer film.

12. The polymer film of claim 1, having a back-to-back coefficient of friction greater than about 0.35.

13. The polymer film of claim 1, wherein said polymer is polyester.

14. The polymer film of claim 1, wherein said binder is present at about 0.1 to about 25 weight percent of said slip control coating.

15. The polymer film of claim 1, wherein said copolyester is present at about 1 to about 10 weight percent of said slip control coating.

16. The polymer film of claim 1, wherein said slip control coating further comprises a surfactant.

17. The polymer film of claim 16, wherein said surfactant comprises an anionic surfactant.

18. The polymer film of claim 17, wherein said surfactant comprises sodium lauryl sulfate.

19. The polymer film of claim 17, wherein said surfactant comprises a fluorosurfactant.

20. The polymer film of claim 17, wherein said surfactant comprises sodium dodecylbenzene sulfonate.

21. The polymer film of claim 17, wherein said surfactant comprises an ethoxylated 2, 4, 7, 9-tetramethyl-5-decyl-4, 7-diol.

22. The polymer film of claim 16, wherein said surfactant is present at about 0.0001 to about 5 weight percent of said slip control coating.

23. The polymer film of claim 16, wherein said surfactant is present at about 0.001 to about 1 weight percent of said slip control coating.

24. The polymer film of claim 1, further comprising a wicking aid.

25. The polymer film of claim 24, wherein said wicking aid comprises at least one silica.

26. The polymer film of claim 25, wherein said wicking aid comprises colloidal SiO$_2$.

27. The polymer film of claim 24, wherein said wicking aid is present at about 0.01 to about 3 weight percent of said slip control coating.

28. The polymer film of claim 24, wherein said wicking aid is present at about 0.1 to about 1 weight percent of said slip control coating.

29. The polymer film of claim 1, wherein said slip control coating has a pH of about 7 to about 10.

30. The polymer film of claim 1, wherein said slip control coating has a pH of about 7.5 to about 9.

31. The polymer film of claim 1, wherein said slip control coating comprises a pH modifier sufficient to give said slip control coating a basic pH.

32. The film of claim 1, wherein said slip control coating comprises ammonium hydroxide.

33. The polymer film of claim 1, wherein said slip control coating has a solids level of about 0.5 to about 12 weight percent.

34. The polymer film of claim 1, wherein said slip control coating has a solids level of about 2 to about 6 weight percent.

35. The polymer film of claim 1, wherein said slip control coating has a coating thickness of about $2.5 \times 10^{-9}$ m to about $2.5 \times 10^{-6}$ m.

36. The polymer film of claim 1, wherein said slip control coating has a coating thickness of about $2.5 \times 10^{-8}$ m.

* * * * *

UNITED STATES PATENT AND TRADEMARK OFFICE
CERTIFICATE OF CORRECTION

PATENT NO. : 6,645,615 B2 Page 1 of 1
DATED : November 11, 2003
INVENTOR(S) : John M. Heberger and Kenneth J. Muschelewicz It is certified that error appears in the above-identified patent and that said Letters Patent is hereby corrected as shown below:

<u>Column 14,</u>
Lines 7, 10 and 13, reads "The polymer film of claim 3…" but should read
-- The polymer film of claim 2… --

Signed and Sealed this

Twenty-third Day of March, 2004

JON W. DUDAS
*Acting Director of the United States Patent and Trademark Office*